United States Patent
Panzica et al.

(10) Patent No.: US 12,077,734 B2
(45) Date of Patent: Sep. 3, 2024

(54) SOLID FRAGRANCE-CONTAINING COMPOSITION

(71) Applicant: Henkel AG & Co. KGaA, Duesseldorf (DE)

(72) Inventors: Danilo Panzica, Hilden (DE); Thomas Holderbaum, Hilden (DE); Peter Schmiedel, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 786 days.

(21) Appl. No.: 17/149,818

(22) Filed: Jan. 15, 2021

(65) Prior Publication Data

US 2021/0130748 A1    May 6, 2021

Related U.S. Application Data

(63) Continuation of application No. PCT/EP2019/060793, filed on Apr. 26, 2019.

(30) Foreign Application Priority Data

Jul. 17, 2018 (DE) .................. 10 2018 211 830.2

(51) Int. Cl.
| | | |
|---|---|---|
| C11D 3/50 | (2006.01) | |
| B01J 2/12 | (2006.01) | |
| B01J 2/26 | (2006.01) | |
| C11D 3/20 | (2006.01) | |

(52) U.S. Cl.
CPC ............. *C11D 3/505* (2013.01); *B01J 2/12* (2013.01); *B01J 2/26* (2013.01); *C11D 3/2079* (2013.01)

(58) Field of Classification Search
CPC .. B01J 2/12; B01J 2/26; C11D 3/2079; C11D 3/505; C11D 11/0088; C11D 7/265

USPC ....................................................... 512/4, 1
See application file for complete search history.

(56) References Cited

U.S. PATENT DOCUMENTS

| | | | |
|---|---|---|---|
| 9,347,022 B1 | 5/2016 | Frentzel et al. | |
| 2019/0119608 A1* | 4/2019 | Schmiedel | ........... C11D 3/2075 |

FOREIGN PATENT DOCUMENTS

| | | | | |
|---|---|---|---|---|
| DE | 102007007310 A1 * | 8/2008 | ................ | B01J 2/26 |
| DE | 102013224448 A1 | 5/2015 | | |
| DE | 102016219294 A1 | 3/2018 | | |
| EP | 0816468 A1 | 1/1998 | | |
| JP | 2002030280 | * | 1/2002 | |
| JP | 2002030280 A * | 1/2002 | | |
| WO | 2019/120958 A1 | 6/2019 | | |

OTHER PUBLICATIONS

Saida, JP 2002-030280 Machine Translation, Jan. 31, 2002 (Year: 2002).*
Roth et al, DE 102007007310 Machine Translation, Aug. 14, 2008 (Year: 2008).*
International Search Report & Written Opinion PCT/EP2019/060793 Completed: Jul. 17, 2019; Mailing Date: Jul. 24, 2019 7 Pages.

* cited by examiner

*Primary Examiner* — Jessica Whiteley
(74) *Attorney, Agent, or Firm* — Bojuan Deng

(57) ABSTRACT

The invention relates to a method, including: a) producing a melt from sodium acetate trihydrate; b) possibly adding further optional contents; c) possibly adding at least one aesthetic element; d) feeding the melt to a drop former having a rotating, perforated outer drum; e) discharging drops of the melt onto a steel strip by way of the drop former, wherein the mixture output from the drop former has a weight ratio of water to sodium acetate of 0.63 or more. The invention further relates to melting bodies producible by this method.

17 Claims, No Drawings

SOLID FRAGRANCE-CONTAINING COMPOSITION

FIELD OF THE INVENTION

The present invention relates to a method for preparing a solid, particulate composition comprising at least one water-soluble carrier material and at least one fragrance, the carrier material being sodium acetate trihydrate, of which the water vapor partial pressure at approximately 58° C. corresponds to the $H_2O$ partial pressure of the saturated solution of this salt, such that the salt melts at this temperature in its own water of crystallization. The composition is characterized in that it has significantly improved water solubility compared with known compositions based on polyethylene glycol.

BACKGROUND OF THE INVENTION

When using washing and cleaning agents, the consumer not only aims to wash, clean or care for the objects to be treated, but also wishes that after treatment, for example after washing, the treated objects, such as textiles, have a pleasant smell. For this reason in particular, most commercially available washing and cleaning agents contain fragrances.

Fragrances are often used in the form of fragrance particles, either as an integral component of a washing or cleaning agent, or dosed into the washing drum right at the beginning of a wash cycle in a separate form. In this way, the consumer can control the fragrancing of the laundry to be washed by means of individual metering.

The main constituent of such fragrance pastilles known in the prior art is typically a water-soluble or at least water-dispersible carrier polymer, such as polyethylene glycol (PEG), which is used as a vehicle for the integrated fragrances and which dissolves more or less completely in the wash liquor during the washing process, so as to release the fragrances contained and optionally other components into the wash liquor. For the preparation of the known fragrance pastilles, a melt is produced from the carrier polymer, which melt contains the remaining ingredients, or these are then added, and the resulting melt is then fed to a shaping process, during the course of which the melt cools, solidifies and assumes the desired shape.

The known products are disadvantageous in that the polymer materials used, in particular PEG, have delayed solubility, which can lead to residues on the laundry or in the washing machine, in particular in the case of short wash cycles, low temperature or other unfavorable conditions.

BRIEF SUMMARY OF THE INVENTION

The problem addressed by the present invention was therefore to identify a method for preparing an alternative composition which exhibits a suitable processing range and at the same time exhibits improved water solubility in the usual temperature ranges in which work is carried out.

Another problem addressed by the invention was to provide methods which are robust, that is to say methods which are carried out without frequent and/or long-lasting interruptions. In particular, these methods should require a minimum of maintenance and cleaning of the method equipment.

Proposed solutions to the aforementioned technical problem are disclosed in German patent application DE 10 2007 007 310 A1.

The problem has been solved, according to the invention, by a formulation for melt bodies based on sodium acetate trihydrate as the carrier material, which is melted to form a melt at a specific weight ratio of water to sodium acetate before being converted into melt bodies.

The application relates first to a method comprising:
a) producing a melt from sodium acetate trihydrate;
b) optionally metering in additional optional ingredients;
c) optionally metering in at least one aesthetic component;
d) feeding the melt to a drop former which has a rotating, perforated outer drum;
e) discharging drops of the melt onto a cooling belt by means of the drop former, wherein the mixture discharged from the drop former has a weight ratio of water to sodium acetate of 0.63 or greater.

"At least one," as used herein, refers to one or more, for example 1, 2, 3, 4, 5, 6, 7, 8, 9 or more. In particular, this expression refers to the type of agent/compound and not to the absolute number of molecules. "At least one fragrance" therefore means that at least one type of fragrance is included but also that 2 or more different types of fragrances may be contained.

DETAILED DESCRIPTION OF THE INVENTION

In the method according to the invention, a melt from sodium acetate trihydrate is discharged onto a cooling belt by means of a drop former. The term "melt" refers to the liquid state of the sodium acetate trihydrate which it assumes when the temperature at which the sodium acetate eliminates water of crystallization and dissolves in said water of crystallization is exceeded. For sodium acetate trihydrate $(Na(CH_3COO)\cdot 3H_2O)$, this temperature is approximately 58° C.

The melt from sodium acetate trihydrate in step a) of the method can thus be obtained by heating sodium acetate trihydrate to temperatures greater than 58° C. Alternatively, this melt can be prepared by dissolving anhydrous sodium acetate in a sufficient amount of water at temperatures greater than 58° C.

In the sodium acetate trihydrate, the weight ratio of water (Mw 18.02) to sodium acetate (Mw 82.03) is 0.659. A characteristic of the method according to the invention is a weight ratio of water to sodium acetate of 0.63 or greater. A weight ratio of water to sodium acetate of 0.67 or greater or, in other words, a water content of the melt discharged onto the cooling belt in step e) that is hyperstoichiometric based on sodium acetate trihydrate, is particularly preferred. The weight ratio of water to sodium acetate of 0.67 or greater is superior, in terms of the underlying technical problems, to the weight ratio of 0.63 which is already advantageous in relation to these problems.

The proportion by weight of the sodium acetate trihydrate with respect to this melt discharged in step e), based on the total weight thereof, is from 30 to 95 wt. %, preferably from 40 to 90 wt. %, in particular from 45 to 80 wt. %. The weight ratio of water to sodium acetate in the melt produced in step a) and the melt discharged from the drop former in step e) is preferably between 0.67 and 0.75, preferably between 0.67 and 0.74 and in particular between 0.68 and 0.72. This specific weight ratio increases the process stability and minimizes the need for method interruptions for maintenance and cleaning, and advantageously influences the visual appearance of the method products and the shelf life thereof.

In order to improve the ease of processing and the product appearance, at least one rheology modifier can be added to the melt during the course of the method, but particularly before step e), with organic and inorganic compounds having proven to be suitable.

A first group of preferred organic rheology modifiers are celluloses, in particular microfibrillated celluloses. Methods during the course of which an organic rheology modifier, preferably an organic rheology modifier from the group of celluloses, in particular microfibrillated celluloses, is metered in are preferred. Furthermore, it is preferred that the melt discharged in step e), based on the total weight thereof, contains the organic rheology modifier in an amount of from 2.0 to 40 wt. %, preferably from 4.0 to 35 wt. %.

Inorganic rheology modifiers can be used as an alternative to or in combination with the aforementioned organic rheology modifiers. In a preferred method variant, an inorganic rheology modifier, preferably an inorganic rheology modifier from the group of pyrogenic silicic acids, is metered in in step b). Inorganic rheology modifiers are contained in the melt discharged in step e), based on the total weight thereof, in an amount of from 0.5 to 7.0 wt. %, preferably from 1.0 to 5.0 wt. %.

Also with the aim of improving the ease of processing the melt during the course of the method, an emulsifier, preferably an emulsifier from the group of non-ionic emulsifiers, is metered into the melt in step b) in a preferred method variant. The emulsifier is contained in the melt discharged in step e), based on the total weight thereof, in an amount of from 0.2 to 5.0 wt. %, preferably from 0.4 to 3.0 wt. %.

At least one aesthetic component is preferably metered into the melt produced in step a). Preferred aesthetic components are fragrances and dyes.

A fragrance is a chemical substance that stimulates the sense of smell. In order to be able to stimulate the sense of smell, it should be possible to at least partially distribute the chemical substance in the air, i.e. the fragrance should be volatile at 25° C. at least to a small extent. If the fragrance is very volatile, the odor intensity abates quickly. At a lower volatility, however, the smell is longer-lasting, i.e. it does not disappear as quickly. In one embodiment, the fragrance therefore has a melting point in the range of from −100° C. to 100° C., preferably from −80° C. to 80° C., more preferably from −20° C. to 50° C., in particular from −30° C. to 20° C. In another embodiment, the fragrance has a boiling point in the range of from 25° C. to 400° C., preferably from 50° C. to 380° C., more preferably from 75° C. to 350° C., in particular from 100° C. to 330° C.

Overall, in order to act as a fragrance, a chemical substance should not exceed a certain molecular weight since, if the molecular weight is too high, the required volatility can no longer be ensured. In one embodiment, the fragrance has a molecular weight of from 40 to 700 g/mol, more preferably from 60 to 400 g/mol.

The odor of a fragrance is perceived by most people as pleasant and often corresponds to the smell of, for example, flowers, fruits, spices, bark, resin, leaves, grasses, mosses and roots. Fragrances can thus also be used to overlay unpleasant odors or even to provide a non-smelling substance with a desired odor. It is possible, for example, to use individual odorant compounds, such as synthetic products of the ester, ether, aldehyde, ketone, alcohol and hydrocarbon types, as fragrances.

Fragrance compounds of the aldehyde type are, for example, adoxal (2,6,10-trimethyl-9-undecenal), anisaldehyde (4-methoxybenzaldehyde), cymene (3-(4-isopropylphenyl)-2-methylpropanal), ethylvanillin, Florhydral (3-(3-isopropylphenyl)butanal), Helional (3-(3,4-methylenedioxyphenyl)-2-methylpropanal), heliotropin, hydroxycitronellal, lauraldehyde, Lyral (3- and 4-(4-hydroxy-4-methylpentyl)-3-cyclohexene-1-carboxaldehyde), methylnonylacetaldehyde, Lilial (3-(4-tert-butylphenyl)-2-methylpropanal), phenylacetaldehyde, undecylenealdehyde, vanillin, 2,6,10-trimethyl-9-undecenal, 3-dodecen-1-al, alpha-n-amylcinnamaldehyde, melonal (2,6-dimethyl-5-heptenal), 2,4-di-methyl-3-cyclohexene-1-carboxaldehyde (Triplal), 4-methoxybenzaldehyde, benzaldehyde, 3-(4-tert-butyl phenyl)-propanal, 2-methyl-3-(para-methoxyphenyl) propanal, 2-methyl-4-(2,6,6-timethyl-2(1)-cyclohexen-1-yl) butanal, 3-phenyl-2-propenal, cis-/trans-3,7-dimethyl-2,6-octadien-1-al, 3,7-dimethyl-6-octen-1-al, [(3,7-dimethyl-6-octenyl)oxy]acetaldehyde, 4-isopropylbenzylaldehyde, 1,2,3,4,5,6,7,8-octahydro-8,8-dimethyl-2-naphthaldehyde, 2,4-dimethyl-3-cyclohexene-1-carboxaldehyde, 2-methyl-3-(isopropylphenyl)propanal, 1-decanal, 2,6-dimethyl-5-heptenal, 4-(tricyclo[5.2.1.0(2,6)]-decylidene-8)-butanal, octahydro-4,7-methane-1H-indenecarboxaldehyde, 3-ethoxy-4-hydroxybenzaldehyde, para-ethyl-alpha, alpha-dimethylhydrocinnamaldehyde, alpha-methyl-3,4-(methylenedioxy)-hydrocinnamaldehyde, 3,4-methylenedioxybenzaldehyde, alpha-n-hexylcinnamaldehyde, m-cymene-7-carboxaldehyde, alpha-methylphenylacetaldehyde, 7-hydroxy-3,7-dimethyloctanal, undecenal, 2,4,6-trimethyl-3-cyclohexene-1-carboxaldehyde, 4-(3)(4-methyl-3-pentenyl)-3-cyclohexene carboxaldehyde, 1-dodecanal, 2,4-dimethylcyclohexene-3-carboxaldehyde, 4-(4-hydroxy-4-methylpentyl)-3-cyclohexene-1-carboxaldehyde, 7-methoxy-3,7-dimethyloctan-1-al, 2-methyl-undecanal, 2-methyldecanal, 1-nonanal, 1-octanal, 2,6,10-trimethyl-5,9-undecadienal, 2-methyl-3-(4-tert-butyl)propanal, dihydrocinnamaldehyde, 1-methyl-4-(4-methyl-3-pentenyl)-3-cyclohexene-1-carboxaldehyde, 5- or 6-methoxyhexahydro-4,7-methanindan-1- or 2-carboxaldehyde, 3,7-dimethyloctan-1-al, 1-undecanal, 10-undecen-1-al, 4-hydroxy-3-methoxybenzaldehyde, 1-methyl-3-(4-methylpentyl)-3-cyclohexenecarboxaldehyde, 7-hydroxy-3J-dimethyl-octanal, trans-4-decenal, 2,6-nonadienal, para-tolylacetaldehyde, 4-methylphenylacetaldehyde, 2-methyl-4-(2,6,6-trimethyl-1-cyclohexen-1-yl)-2-butenal, ortho-methoxycinnamaldehyde, 3,5,6-trimethyl-3-cyclohexene-carboxaldehyde, 3J-dimethyl-2-methylene-6-octenal, phenoxyacetaldehyde, 5,9-dimethyl-4,8-decadienal, peony-aldehyde (6,10-dimethyl-3-oxa-5,9-undecadien-1-al), hexahydro-4,7-methanindan-1-carboxaldehyde, 2-methyloctanal, alpha-methyl-4-(1-methylethyl)benzeneacetaldehyde, 6,6-dimethyl-2-norpinene-2-propionaldehyde, para-methylphenoxyacetaldehyde, 2-methyl-3-phenyl-2-propen-1-al, 3,5,5-trimethylhexanal, hexahydro-8,8-dimethyl-2-naphthaldehyde, 3-propyl-bicyclo-[2.2.1]-hept-5-ene-2-carbaldehyde, 9-decenal, 3-methyl-5-phenyl-1-pentanal, methylnonylacetaldehyde, hexanal and trans-2-hexenal.

Fragrance compounds of the ketone type are, for example, methyl-beta-naphthyl ketone, musk indanone (1,2,3,5,6,7-hexahydro-1,1,2,3,3-pentamethyl-4H-inden-4-one), tonalide (6-acetyl-1,1,2,4,4,7-hexamethyltetralin), alpha-damascone, beta-damascone, delta-damascone, iso-damascone, damascenone, methyldihydrojasmonate, menthone, carvone, camphor, Koavone (3,4,5,6,6-pentamethylhept-3-en-2-one), fenchone, alpha-ionone, beta-ionone, gamma-methyl-ionone, fleuramone (2-heptylcyclopentanone), dihydrojasmone, cis-jasmone, Iso-E-Super (1-(1,2,3,4,5,6J,8-octahydro-2,3,8,8-tetramethyl-2-naphthalenyl)-ethan-1-one (and isomers)), methyl cedrenyl ketone, acetophenone, methyl acetophenone, para-methoxy acetophenone, methyl beta-naphthyl ketone, benzyl acetone, benzophenone, para-hydroxyphenyl butanone, celery ketone (3-methyl-5-propyl-2-cyclohexenone), 6-isopropyldecahydro-2-naphthone, dimethyloctenone, frescomenthe (2-butan-2-yl-cyclohexan-1-one), 4-(1-ethoxyvinyl)-3,3,5,5-tetramethylcyclohexanone, methylheptenone, 2-(2-(4-methyl-3-cyclohexen-1-yl)propyl)cyclopentanone, 1-(p-menthen-6(2)-yl)-1-propanone, 4-(4-hydroxy-3-methoxyphenyl)-2-butanone, 2-acetyl-3,3-dimethylnorbornane, 6,7-dihydro-1,1,2,3,3-pentamethyl-4(5H)-indanone, 4-damascol, Dulcinyl (4-(1,3-benzodioxol-5-yl)butan-2-one), Hexalone (1-(2,6,6-trimethyl-2-cyclohexen-1-yl)-1,6-heptadien-3-one), Isocyclemone E (2-acetonaphthone-1,2,3,4,5,6,7,8-octahydro-2,3,8,8-tetramethyl), methyl nonylketone, methylciclocitrone, methyl lavender ketone, Orivone (4-tert-amyl-cyclohexanone), 4-tert-butylcyclohexanone, Delphone (2-pentyl-cyclopentanone), muscone (CAS 541-91-3), Neobutenone (1-(5,5-dimethyl-1-cyclohexenyl)pent-4-en-1-one), plicatone (CAS 41724-19-0), Veloutone (2,2,5-trimethyl-5-pentylcyclopentan-1-one), 2,4,4,7-tetramethyl-oct-6-en-3-one and tetramerane (6,10-dimethylundecen-2-one).

Fragrance compounds of the alcohol type are, for example, 10-undecen-1-ol, 2,6-dimethylheptan-2-ol, 2-methylbutanol, 2-methylpentanol, 2-phenoxyethanol, 2-phenylpropanol, 2-tert-butycyclohexanol, 3,5,5-trimethyl-cyclohexanol, 3-hexanol, 3-methyl-5-phenylpentanol, 3-octanol, 3-phenyl-propanol, 4-heptenol, 4-isopropylcyclohexanol, 4-tert-butycyclohexanol, 6,8-dimethyl-2-nonanol, 6-nonen-1-ol, 9-decen-1-ol, α-methylbenzyl alcohol, α-terpineol, amyl salicylate, benzyl alcohol, benzyl salicylate, β-terpineol, butyl salicylate, citronellol, cyclohexyl salicylate, decanol, dihydromyrcenol, dimethyl benzyl carbinol, dimethyl heptanol, dimethyl octanol, ethyl salicylate, ethyl vanillin, eugenol, farnesol, geraniol, heptanol, hexyl salicylate, isoborneol, isoeugenol, isopulegol, linalool, menthol, myrtenol, n-hexanol, nerol, nonanol, octanol, p-menthan-7-ol, phenylethyl alcohol, phenol, phenyl salicylate, tetrahydrogeraniol, tetrahydrolinalool, thymol, trans-2-cis-6-nonadicnol, trans-2-nonen-1-ol, trans-2-octenol, undecanol, vanillin, champiniol, hexenol and cinnamyl alcohol.

Fragrance compounds of the ester type are, for example, benzyl acetate, phenoxyethyl isobutyrate, p-tert-butylcyclohexyl acetate, linalyl acetate, dimethylbenzylcarbinyl acetate (DMBCA), phenylethyl acetate, benzyl acetate, ethylmethylphenyl glycinate, allylcyclohexyl propionate, styrallyl propionate, benzyl salicylate, cyclohexyl salicylate, floramate, melusate, and jasmacyclate.

Ethers include, for example, benzyl ethyl ether and Ambroxan. Hydrocarbons mainly include terpenes such as limonene and pinene.

Preferably, mixtures of different fragrances are used, which together produce an appealing fragrance note. Such a mixture of fragrances may also be referred to as perfume or perfume oil. Perfume oils of this kind may also contain natural fragrance mixtures, such as those obtainable from plant sources.

Fragrances of plant origin include essential oils such as angelica root oil, aniseed oil, arnica blossom oil, basil oil, bay oil, champaca blossom oil, citrus oil, abies alba oil, abies alba cone oil, elemi oil, eucalyptus oil, fennel oil, pine needle oil, galbanum oil, geranium oil, ginger grass oil, guaiac wood oil, gurjun balsam oil, helichrysum oil, ho oil, ginger oil, iris oil, jasmine oil, cajeput oil, calamus oil, chamomile oil, camphor oil, cananga oil, cardamom oil, cassia oil, pine needle oil, copaiba balsam oil, coriander oil, spearmint oil, caraway oil, cumin oil, labdanum oil, lavender oil, lemon grass oil, lime blossom oil, lime oil, mandarin oil, melissa oil, mint oil, musk seed oil, muscatel oil, myrrh oil, clove oil, neroli oil, niaouli oil, olibanum oil, orange blossom oil, orange peel oil, oregano oil, palmarosa oil, patchouli oil, balsam Peru oil, petitgrain oil, pepper oil, peppermint oil, allspice oil, pine oil, rose oil, rosemary oil, sage oil, sandalwood oil, celery oil, spike lavender oil, star anise oil, turpentine oil, thuja oil, thyme oil, verbena oil, vetiver oil, juniper berry oil, wormwood oil, wintergreen oil, ylang-ylang oil, hyssop oil, cinnamon oil, cinnamon leaf oil, citronella oil, lemon oil and cypress oil, and ambrettolide, Ambroxan, alpha-amylcinnamaldehyde, anethole, anisaldehyde, anise alcohol, anisole, anthranilic acid methyl ester, acetophenone, benzylacetone, benzaldehyde, benzoic acid ethyl ester, benzophenone, benzyl alcohol, benzyl acetate, benzyl benzoate, benzyl formate, benzyl valerianate, borneol, bornyl acetate, boisambrene forte, alpha-bromostyrene, n-decylaldehyde, n-dodecyl aldehyde, eugenol, eugenol methyl ether, eucalyptol, farnesol, fenchone, fenchyl acetate, geranyl acetate, geranyl formate, heliotropin, heptyne carboxylic acid methyl ester, heptaldehyde, hydroquinone dimethyl ether, hydroxycinnamaldehyde, hydroxycinnamyl alcohol, indole, irone, isoeugenol, isoeugenol methyl ether, isosafrole, jasmine, camphor, carvacrol, carvone, p-cresol methyl ether, coumarin, p-methoxyacetophenone, methyl n-amyl ketone, methylanthranilic acid methyl ester, p-methylacetophenone, methyl chavicol, p-methylquinoline, methyl beta-naphthyl ketone, methyl n-nonyl acetaldehyde, methyl n-nonyl ketone, muscone, beta-naphthol ethyl ether, beta-naphthol methyl ether, nerol, n-nonylaldehyde, nonyl alcohol, n-octylaldehyde, p-oxy-acetophenone, pentadecanolide, beta-phenethyl alcohol, phenylacetic acid, pulegone, safrole, salicylic acid isoamyl ester, salicylic acid methyl ester, salicylic acid hexyl ester, salicylic acid cyclohexyl ester, santalol, sandelice, skatole, terpineol, thymene, thymol, troenan, gamma-undecalactone, vanillin, veratraldehyde, cinnamaldehyde, cinnamyl alcohol, cinnamic acid, cinnamic acid ethyl ester, cinnamic acid benzyl ester, diphenyl oxide, limonene, linalool, linalyl acetate and propionate, melusate, menthol, menthone, methyl-n-heptenone, pinene, phenylacetaldehyde, terpinyl acetate, citral, citronellal and mixtures thereof.

In a preferred method variant, perfume oil is metered in as the aesthetic component in step c). The melt discharged in step e) preferably contains, based on the total weight thereof, the perfume oil in an amount of from 0.01 to 2.0 wt. %, preferably from 0.05 to 1.0 wt. %.

In one embodiment, it may be preferable for at least some of the fragrance to be used as a fragrance precursor or in encapsulated form (fragrance capsules), in particular in microcapsules. The microcapsules may be water-soluble and/or water-insoluble microcapsules. For example, melamine-urea-formaldehyde microcapsules, melamine-formaldehyde microcapsules, urea-formaldehyde microcapsules or starch microcapsules can be used. "Fragrance precursor" refers to compounds that release the actual fragrance only after chemical conversion/cleavage, typically by exposure to light or other environmental conditions such as pH, temperature, etc. Such compounds are often also referred to as fragrance storage substances or "pro-fragrances."

Further preferred method variants are characterized in that fragrance capsules are used as the aesthetic component. Furthermore, it is preferred if the melt discharged in step e), based on the total weight thereof, contains the fragrance capsules in an amount of from 0.1 to 5.0 wt. %, preferably from 0.2 to 3.5 wt. %.

In order to improve the visual impression of the method products, a dye can be added to the melt produced in step a).

Preferred dyes, which can be selected by a person skilled in the art without any difficulty at all, should be highly stable in storage, unaffected by conventional ingredients of the washing or cleaning agent, insensitive to light and should not exhibit pronounced substantivity with respect to textile fibers in order to avoid dyeing said fibers.

The dye is preferably selected from Acid Red 18 (CI 16255), Acid Red 26, Acid Red 27, Acid Red 33, Acid Red 51, Acid Red 87, Acid Red 88, Acid Red 92, Acid Red 95, Acid Red 249 (CI 18134), Acid Red 52 (CI 45100), Acid Violet 126, Acid Violet 48, Acid Violet 54, Acid Yellow 1, Acid Yellow 3 (CI 47005), Acid Yellow 11, Acid Yellow 23 (CI 19140), Acid Yellow 3, Direct Blue 199 (CI 74190), Direct Yellow 28 (CI 19555), Food Blue 2 (CI 42090), Food Blue 5:2 (CI 42051:2), Food Red 7 (CI 16255), Food Yellow 13 (CI 47005), Food Yellow 3 (CI 15985), Food Yellow 4 (CI 19140), Reactive Green 12 and Solvent Green 7 (CI 59040).

Particularly preferred dyes are water-soluble acid dyes, for example Food Yellow 13 (Acid Yellow 3, CI 47005), Food Yellow 4 (Acid Yellow 23, CI 19140), Food Red 7 (Acid Red 18, CI 16255), Food Blue 2 (Acid Blue 9, CI 42090), Food Blue 5 (Acid Blue 3, CI 42051), Acid Red 249 (CI 18134), Acid Red 52 (CI 45100), Acid Violet 126, Acid Violet 48, Acid Blue 80 (CI 61585), Acid Blue 182, Acid Blue 182, Acid Green 25 (CI 61570) and Acid Green 81.

Water-soluble direct dyes, for example Direct Yellow 28 (CI 19555) and Direct Blue 199 (CI 74190), and water-soluble reactive dyes, for example Reactive Green 12, and the dyes Food Yellow 3 (CI 15985) and Acid Yellow 184, are equally preferably used.

Aqueous dispersions of the following pigment dyes are equally preferably used: Pigment Black 7 (CI 77266), Pigment Blue 15 (CI 74160), Pigment Blue 15:1 (CI 74160), Pigment Blue 15:3 (CI 74160), Pigment Green 7 (CI 74260), Pigment Orange 5, Pigment Red 112 (CI 12370), Pigment Red 112 (CI 12370), Pigment Red 122 (CI 73915), Pigment Red 179 (CI 71130), Pigment Red 184 (CI 12487), Pigment Red 188 (CI 12467), Pigment Red 4 (CI 12085), Pigment Red 5 (CI 12490), Pigment Red 9, Pigment Violet 23 (CI 51319), Pigment Yellow 1 (CI 28 11680), Pigment Yellow 13 (CI 21100), Pigment Yellow 154, Pigment Yellow 3 (CI 11710), Pigment Yellow 74, Pigment Yellow 83 (CI 21108) and Pigment Yellow 97. In preferred embodiments, the following pigment dyes are used in the form of dispersions: Pigment Yellow 1 (CI 11680), Pigment Yellow 3 (CI 11710), Pigment Red 112 (CI 12370), Pigment Red 5 (CI 12490), Pigment Red 181 (CI 73360), Pigment Violet 23 (CI 51319), Pigment Blue 15:1 (CI 74160), Pigment Green 7 (CI 74260) and Pigment Black 7 (CI 77266).

In equally preferred embodiments, water-soluble polymer dyes are used, for example Liquitint, Liquitint Blue HP, Liquitint Blue MC, Liquitint Blue 65, Liquitint Cyan 15, Liquitint Patent Blue, Liquitint Violet 129, Liquitint Royal Blue, Liquitint Experimental Yellow 8949-43, Liquitint Green HMC, Liquitint Yellow LP, Liquitint Yellow II and mixtures thereof.

The use of water-soluble dyes is particularly preferred, the use of water-soluble polymer dyes being more particularly preferred.

The group of very particularly preferred dyes includes Acid Blue 3, Acid Yellow 23, Acid Red 33, Acid Violet 126, Liquitint Yellow LP, Liquitint Cyan 15, Liquitint Blue HP and Liquitint Blue MC.

A further preferred method variant is characterized in that a dye, preferably a water-soluble dye, particularly preferably a water-soluble polymer dye, is added to the melt as the aesthetic component. Furthermore, it is preferred that the melt discharged in step e), based on the total weight thereof, contains the dye in an amount of from 0.001 to 0.5 wt. %, preferably from 0.002 to 0.2 wt. %.

For reasons of economy of method, it is preferable to meter the at least one aesthetic component into the melt only at a late stage in the method. In so doing, the cleaning effort and the amount of contaminated (non-recipe-compliant) method product, for example, is minimized when changing the recipe. A preferred method variant is therefore characterized in that the melt in step a) is prepared in a first container and fed to the drop former by means of a pipe, the aesthetic component being metered into the melt in the pipe between the first container and the drop former.

Water-miscible organic solvents are a further preferred method reactant. The solvents are preferably added to the melt before step e).

Preferred water-miscible organic solvents originate from the group of ethanol, n-propanol, i-propanol, butanols, glycol, propanediol, butanediol, methylpropanediol, glycerol, propylene carbonate, diglycol, dipropylene glycol, propyl diglycol, butyl diglycol, hexylene glycol, diethylene glycol ethyl ether, diethylene glycol methyl ether, diethylene glycol-n-butyl ether, diethylene glycol hexyl ether, diethylene glycol-n-butyl ether acetate, ethylene glycol propyl ether, ethylene glycol-n-butyl ether, ethylene glycol hexyl ether, ethylene glycol-n-butyl ether acetate, triethylene glycol, triethylene glycol methyl ether, triethylene glycol ethyl ether, triethylene glycol-n-butyl ether, ethylene glycol phenyl ether, propylene glycol methyl ether, dipropylene glycol methyl ether, tripropylene glycol methyl ether, propylene glycol methyl ether acetate, dipropylene glycol methyl ether acetate, propylene glycol-n-propyl ether, dipropylene glycol-n-propyl ether, propylene glycol-n-butyl ether, dipropylene glycol-n-butyl ether, tripropylene glycol-n-butyl ether, propylene glycol phenyl ether, propylene glycol diacetate, dipropylene glycol dimethyl ether, methoxytriglycol, ethoxytriglycol, butoxytriglycol, 1-butoxyethoxy-2-propanol, 3-methyl-3-methoxybutanol, propylene-glycol-t-butyl ether and di-n-octylether, preferably from the group of glycerol, propylene glycol and dipropylene glycol, in particular from the group of dipropylene glycol.

The proportion by weight of the water-miscible organic solvent with respect to the total weight of the melt discharged in step e), based on the total weight thereof, is preferably from 0.2 to 10 wt. %, in particular from 0.5 to 5.0 wt. %.

In summary, this application particularly preferably relates to a method comprising:
a) producing a melt from sodium acetate trihydrate;
b) metering in
   at least one rheology modifier and
   at least one emulsifier,
c) metering in
   at least one perfume oil and
   at least one fragrance capsule and
   at least one dye;
d) feeding the melt to a drop former which has a rotating, perforated outer drum;
e) discharging drops of the melt onto a cooling belt by means of the drop former,
wherein the mixture discharged from the drop former has a weight ratio of water to sodium acetate of 0.63 or greater, preferably of 0.67 or greater.

As stated at the outset, the specific weight ratio of water to sodium acetate of 0.63 or greater, in particular of 0.67 or greater, establishes the advantageous properties of both the method and the method products. For this reason, setting and maintaining this weight ratio is of fundamental importance for the procedure. In a preferred method variant, the water content of the melt is detected by sensors.

In addition to detecting the water content by means of sensors, or even in an independent preferred variant of the method according to the invention, the water content of the melt is varied during the course of the method, in particular after step a), by adding water.

If the melt in step a) is prepared in a first container and subsequently fed to the drop former by means of a pipe, it is preferable for the water to be metered into the melt in the pipe between the first container and the drop former.

In order to keep the water content in the melt constant, it is preferable for the humidity in the air space above the melt in the first container to deviate by less than 10%, preferably by less than 5%, from the humidity which forms in equilibrium above the melt in the first container. Alternatively or in addition, it is also preferable for the humidity in the air space around the outlet openings of the drop former to deviate by less than 10%, preferably by less than 5%, from the humidity which forms in equilibrium above the melt exiting from the outlet openings.

The pipe preferably has a static mixer between the first container and the drop former. The length of the static mixer mounted in the pipe in the flow direction of the melt dispersion is preferably at least 10 times, more preferably at least 20 times and in particular at least 50 times the diameter of the pipe. The diameter of the pipe refers to the internal diameter of the pipe, without taking the wall thickness into account.

In step d) of the method, the melt is fed to a drop former which has a rotating, perforated outer drum. The portion of the pipe that is located inside the drum of the drop former is referred to in the following as the feed channel, in order to distinguish said portion from the previous pipe. The feed channel preferably extends over at least 80%, particularly preferably over at least 90% and in particular over 100% of the length of the drum of the drop former.

The melt introduced into the feed channel preferably exits the feed channel, through bores located on the lower face of the feed channel, from the feed channel onto a distributor or nozzle strip, which in turn rests on the inner face of the rotating, perforated outer drum. The melt passes through the distributor or nozzle strip and is subsequently discharged from the holes in the rotating outer drum onto a cooling belt located below said holes. The distance between the outer face of the rotating, perforated outer drum and the surface of the cooling belt is preferably between 5 and 20 mm.

A further mixer can be arranged in the feed channel in order to further improve the mixing of the melt and to prevent or minimize sedimentation. This is preferably a dynamic mixer, for example a helix which is rotatably arranged within the feed channel.

The dwell time of the melt in the pipe before emerging from the rotating, perforated outer drum of the drop former is preferably less than 20 seconds, particularly preferably less than 10 seconds and in particular between 0.5 and 5 seconds.

In step e) of the method, drops of the melt are discharged onto a cooling belt by means of the drop former. The viscosity (Texas Instruments AR-G2 rheometer; plate/plate, 4 cm diameter, 1,100 μm column; shear rate 10/1 sec) of the melt as it exits the rotating, perforated outer drum is preferably between 1,000 and 10,000 mPas.

In a preferred method variant, the drops discharged in step e) solidify to form melt bodies. The period during which the drops discharged in step e) remain on the cooling belt is preferably from 20 to 120 seconds, particularly preferably from 30 to 100 seconds and in particular from 40 to 80 seconds.

The solidification of the drops on the cooling belt is preferably facilitated and accelerated by active cooling. The drops discharged onto the cooling belt can be cooled directly or indirectly. For example, cooling by means of cold air can be used as direct cooling. However, indirect cooling of the drops by cooling the underside of the cooling belt by means of cold water is preferred.

Surprisingly, it was found that the previously described weight ratio of water to sodium acetate of 0.67 or greater also advantageously affects the shelf life of the melt bodies, in particular the shelf life at bulk heights above 40 cm, for example at bulk heights above 80 cm or above 120 cm or above 200 cm. After a dwell time on the cooling belt of longer than 40 seconds, preferably longer than 60 seconds and in particular longer than 80 seconds, and even after a long storage period, melt bodies having a corresponding weight ratio are distinguished by good pourability and flowability.

The melt bodies prepared by means of the method described above may have any desired shape. The shaping is performed in particular after step e) of the described method. Solid, particulate shapes, such as substantially spherical, figurative, scaled, cuboid, cylindrical, conical, spherical-cap-shaped, lenticular, hemispherical, disk-shaped or acicular particles are preferred. For example, the particles may have a gummy-bear-like, figurative design. On account of their packaging properties and their performance profile, hemispherical particles are particularly preferred. The method described above is particularly suitable for preparing melt bodies which have a hemispherical shape and a ratio of height to diameter of from 0.25 to 0.65, preferably from 0.35 to 0.45.

On account of their appearance, melt bodies having a maximum diameter of between 4 and 15 mm, preferably between 5 and 10 mm, are characterized by increased customer acceptance and are preferred. In order to satisfy the aesthetic customer requirement described above, it is in particular preferred for at least 20 wt. %, preferably at least 40 wt. %, particularly preferably at least 60 wt. % and most particularly preferably at least 80 wt. %, of the melt bodies prepared by means of the aforementioned method to have a maximum diameter of between 4 and 15 mm, preferably between 5 and 10 mm, in any spatial direction.

Finally, it has proven to be advantageous for the metering of the melt bodies and the fragrance effect thereof if the melt bodies prepared by means of the method have a weight of between 2 and 150 mg, preferably between 4 and 60 mg and in particular between 5 and 10 mg. Preferred methods are characterized in that at least 20 wt. %, preferably at least 40 wt. %, particularly preferably at least 60 wt. % and more particularly preferably at least 80 wt. %, of the melt bodies prepared by means of the method have a weight of between 2 and 150 mg, preferably between 4 and 60 mg and in particular between 5 and 10 mg.

This application further relates to melt bodies comprising (a) sodium acetate trihydrate as a carrier material, (b) optionally additional optional ingredients, (c) optionally additional optional aesthetic components, wherein the melt body has a weight ratio of water to sodium acetate of 0.63 or greater. Particularly preferred melt bodies have a weight ratio of water to sodium acetate of 0.67 or greater, preferably between 0.67 and 0.75, more preferably between 0.67 and 0.73 and in particular between 0.67 and 0.69.

The composition of some preferred melt bodies prepared by means of the method described above can be found in the following table. These melt bodies can of course also be prepared using alternative methods. The melt bodies have a weight ratio of water to sodium acetate of 0.63 or greater, preferably 0.67 or greater, more preferably between 0.67 and 0.75, particularly preferably between 0.67 and 0.74 and in particular between 0.68 and 0.72.

|  | Formula 1 | Formula 2 | Formula 3 | Formula 4 | Formula 5 |
|---|---|---|---|---|---|
| Sodium acetate trihydrate | 30 to 95 | 40 to 90 | 40 to 90 | 40 to 90 | 45 to 80 |
| Rheology modifier | 2.0 to 40 | 2.0 to 40 | 2.0 to 40 | 4.0 to 35 | 4.0 to 35 |
| Emulsifier | 0.2 to 5.0 | 0.2 to 5.0 | 0.2 to 5.0 | 0.4 to 3.0 | 0.4 to 3.0 |
| Perfume oil | 0.01 to 2.0 | 0.01 to 2.0 | 0.02 to 1.5 | 0.02 to 1.5 | 0.05 to 1.0 |
| Misc. | to make up to 100 | to make up to 100 | to make up to 100 | to make up to 100 | to make up to 100 |

|  | Formula 6 | Formula 7 | Formula 8 | Formula 9 | Formula 10 |
|---|---|---|---|---|---|
| Sodium acetate trihydrate | 30 to 95 | 40 to 90 | 40 to 90 | 40 to 90 | 45 to 80 |
| Rheology modifier | 2.0 to 40 | 2.0 to 40 | 2.0 to 40 | 4.0 to 35 | 4.0 to 35 |
| Emulsifier | 0.2 to 5.0 | 0.2 to 5.0 | 0.2 to 5.0 | 0.4 to 3.0 | 0.4 to 3.0 |
| Fragrance capsules | 0.1 to 5.0 | 0.1 to 5.0 | 0.2 to 3.5 | 0.2 to 3.5 | 0.2 to 3.5 |
| Misc. | to make up to 100 | to make up to 100 | to make up to 100 | to make up to 100 | to make up to 100 |

|  | Formula 11 | Formula 12 | Formula 13 | Formula 14 | Formula 15 |
|---|---|---|---|---|---|
| Sodium acetate trihydrate | 30 to 95 | 40 to 90 | 40 to 90 | 40 to 90 | 45 to 80 |
| Rheology modifier | 2.0 to 40 | 2.0 to 40 | 2.0 to 40 | 4.0 to 35 | 4.0 to 35 |
| Emulsifier | 0.2 to 5.0 | 0.2 to 5.0 | 0.2 to 5.0 | 0.4 to 3.0 | 0.4 to 3.0 |
| Perfume oil | 0.01 to 2.0 | 0.01 to 2.0 | 0.02 to 1.5 | 0.02 to 1.5 | 0.05 to 1.0 |
| Fragrance capsules | 0.1 to 5.0 | 0.1 to 5.0 | 0.2 to 3.5 | 0.2 to 3.5 | 0.2 to 3.5 |
| Misc. | to make up to 100 | to make up to 100 | to make up to 100 | to make up to 100 | to make up to 100 |

In summary, the present invention provides, inter alia:
1. A method, comprising:
   a) producing a melt from sodium acetate trihydrate;
   b) optionally metering in additional optional ingredients;
   c) optionally metering in at least one aesthetic component;
   d) feeding the melt to a drop former which has a rotating, perforated outer drum;
   e) discharging drops of the melt onto a cooling belt by means of the drop former,
   wherein the mixture discharged from the drop former has a weight ratio of water to sodium acetate of 0.63 or greater.
2. The method according to point 1, wherein the melt discharged in step e), based on the total weight thereof, contains the sodium acetate trihydrate in an amount of from 30 to 95 wt. %, preferably from 40 to 90 wt. %, in particular from 45 to 80 wt. %.
3. The method according to one of the preceding points, wherein in step b) an organic rheology modifier, preferably an organic rheology modifier from the group of celluloses, in particular microfibrillated celluloses, is metered in.
4. The method according to point 3, wherein the melt discharged in step e), based on the total weight thereof, contains the organic rheology modifier in an amount of from 2.0 to 40 wt. %, preferably from 4.0 to 35 wt. %.
5. The method according to one of points 1 or 2, wherein in step b) an inorganic rheology modifier, preferably an inorganic rheology modifier from the group of pyrogenic silicic acids, is metered in.
6. The method according to point 5, wherein the melt discharged in step e), based on the total weight thereof, contains the inorganic rheology modifier in an amount of from 0.5 to 7.0 wt. %, preferably from 1.0 to 5.0 wt. %.
7. The method according to one of the preceding points, wherein in step b) an emulsifier, preferably an emulsifier from the group of non-ionic emulsifiers, is metered in.
8. The method according to point 7, wherein the melt discharged in step e), based on the total weight thereof, contains the emulsifier in an amount of from 0.2 to 5.0 wt. %, preferably from 0.4 to 3.0 wt. %.
9. The method according to one of the preceding points, wherein in step c) perfume oil is metered in as the aesthetic component.
10. Method according to point 9, wherein the melt discharged in step e), based on the total weight thereof, contains the perfume oil in an amount of from 0.01 to 2.0 wt. %, preferably from 0.05 to 1.0 wt. %.
11. The method according to one of the preceding points, wherein fragrance capsules are used as the aesthetic component.
12. The method according to point 11, wherein the melt discharged in step e), based on the total weight thereof, contains the fragrance capsules in an amount of from 0.1 to 5.0 wt. %, preferably from 0.2 to 3.5 wt. %.
13. Method according to one of the preceding points, wherein a dye, preferably a water-soluble dye, particularly preferably a water-soluble polymer dye, is used as the aesthetic component.
14. The method according to point 13, wherein the melt discharged in step e), based on the total weight thereof, contains the dye in an amount of from 0.001 to 0.5 wt. %, preferably from 0.002 to 0.2 wt. %.
15. The method according to one of the preceding points, wherein the melt in step a) is prepared in a first container and fed to the drop former by means of a pipe, wherein the aesthetic component is metered into the melt in the pipe between the first container and the drop former.
16. Method according to one of the preceding points, wherein a water-miscible organic solvent, preferably a solvent from the group of glycerol, propylene glycol and dipropylene glycol, in particular from the group dipropylene glycol, is metered in before step e).
17. The method according to point 16, wherein the melt discharged in step e), based on the total weight thereof, contains the water-miscible organic solvent in an amount of from 0.2 to 10 wt. %, in particular 0.5 to 5.0 wt. %.
18. The method according to one of the preceding points, wherein the melt produced in the first container has a weight ratio of water to sodium acetate of greater than 0.67, preferably between 0.67 and 0.75, more preferably between 0.67 and 0.74, in particular between 0.68 and 0.72.
19. The method according to one of the preceding points, wherein the mixture discharged from the drop former has a weight ratio of water to sodium acetate of greater than 0.67, preferably between 0.67 and 0.75, more preferably between 0.67 and 0.74, in particular between 0.68 and 0.72.
20. The method according to one of the preceding points, wherein the water content of the melt is detected by sensors during the course of the method.
21. The method according to one of the preceding points, wherein the water content of the melt is varied during the course of the method, in particular after step a), by adding water.
22. The method according to point 21, wherein the melt in step a) is prepared in a first container and fed to the drop former by means of a pipe, wherein the water is metered into the melt in the pipe between the first container and the drop former.
23. The method according to one of the preceding points, wherein the humidity in the air space above the melt in the first container deviates by less than 10%, preferably by less than 5%, from the humidity which forms in equilibrium above the melt in the first container.
24. The method according to one of the preceding points, wherein the humidity in the air space around the outlet openings of the drop former deviates by less than 10%, preferably by less than 5%, from the humidity which forms in equilibrium above the melt exiting from the outlet openings.
25. The method according to one of the preceding points, wherein the drops discharged in step e) remain on the cooling belt for a period of from 20 to 120 seconds, preferably from 30 to 100 seconds and in particular from 40 to 80 seconds.
26. The method according to one of the preceding points, wherein the drops discharged in step e) solidify to form melt bodies.
27. The method according to point 26, wherein the solidified melt bodies are stored in bulk containers at a bulk height above 40 cm, preferably above 80 cm, particularly preferably above 120 cm and in particular above 200 cm.
28. The method according to point 26 or 27, wherein the melt bodies have a maximum diameter between 4 and 15 mm, preferably between 5 and 10 mm.
29. The method according to one of points 26 to 28, wherein the melt bodies have a hemispherical shape and a ratio of height to diameter of from 0.25 to 0.65, preferably from 0.35 to 0.45.
30. The method according to one of points 26 to 29, wherein the melt bodies have a weight of from 2 to 150 mg, preferably from 5 to 10 mg.
31. A melt body comprising
 (a) sodium acetate trihydrate as a carrier material,
 (b) optionally additional optional ingredients,
 (c) optionally additional optional aesthetic components,
wherein the particulate composition has a weight ratio of water to sodium acetate of 0.63 or greater.
32. The melt body according to point 31, wherein the melt body has a weight ratio of water to sodium acetate of greater than 0.67, preferably between 0.67 and 0.75, more preferably between 0.67 and 0.73, in particular between 0.67 and 0.69.

What is claimed is:
1. A method for preparing a solid composition, the method comprising:
 producing a melt comprising water and sodium acetate trihydrate;
 metering at least one fragrance into the melt;
 feeding the melt to a drop former comprising a rotating, perforated outer drum; and
 discharging, from the drop former, drops of the melt onto a cooling belt,
 wherein the drops discharged from the drop former have a weight ratio of water to sodium acetate of 0.63 or greater.
2. The method according to claim 1, wherein the drops discharged from the drop former comprise the sodium acetate trihydrate in an amount of from 30 to 95 wt. % based on the total weight of the drops.
3. The method according to claim 1, wherein the at least one fragrance comprises at least one of perfume oil or fragrance capsules.
4. The method according to claim 1, wherein the weight ratio of the water to the sodium acetate of the drops discharged from the drop former is greater than 0.67.
5. The method according to claim 1, wherein the melt is produced in a first container and fed to the drop former via a pipe, the method further comprising:
 metering the water into the melt via the pipe between the first container and the drop former.
6. The method according to claim 1, wherein the drops discharged from the drop former solidify to form melt bodies.
7. The method according to claim 2, wherein the drops discharged from the drop former comprise the sodium acetate trihydrate in an amount of from 40 to 90 wt. % based on the total weight of the drops.
8. The method according to claim 7, wherein the drops discharged from the drop former comprise the sodium acetate trihydrate in an amount of from 45 to 80 wt. % based on the total weight of the drops.
9. The method according to claim 4, wherein the weight ratio of the water to the sodium acetate of the drops discharged from the drop former is between 0.67 and 0.75.
10. The method according to claim 9, wherein the weight ratio of the water to the sodium acetate of the drops discharged from the drop former is between 0.67 and 0.74.
11. The method according to claim 10, wherein the weight ratio of the water to the sodium acetate of the drops discharged from the drop former is between 0.68 and 0.72.
12. The method according to claim 1, wherein the at least one fragrance is of a type selected from the group consisting of an ester type, an ether type, an aldehyde type, a ketone type, an alcohol type, a hydrocarbon type, and mixtures thereof.
13. The method according to claim 1, further comprising metering at least one additional ingredient into the melt.
14. The method according to claim 13, wherein the at least one additional ingredient comprises at least one rheology modifier.

15. The method according to claim 13, wherein the at least one additional ingredient comprises at least one water-miscible organic solvent.

16. The method according to claim 1, further comprising metering at least one dye into the melt.

17. The method according to claim 1, wherein producing the melt comprising the water and the sodium acetate trihydrate comprises heating the water and the sodium acetate trihydrate to a temperature greater than 58° C.

* * * * *